United States Patent Office 3,707,551
Patented Dec. 26, 1972

3,707,551
PHARMACEUTICALLY ACTIVE DERIVATIVES OF ETHANOOCTAHYDROPHENANTHRENE
Kyu Tai Lee and Joel G. Whitney, Wilmington, Del., assignors to E. I. du Pont de Nemours and Company, Wilmington, Del.
No Drawing. Original application Mar. 4, 1968, Ser. No. 709,908. Divided and this application Feb. 11, 1971, Ser. No. 114,684
Int. Cl. C07c 47/52, 69/14, 103/20
U.S. Cl. 260—479 R                 6 Claims

ABSTRACT OF THE DISCLOSURE

Novel disubstituted and polysubstituted 2,4'-ethanooctahydrophenanthrene- and 2,4'-ethanohexahydrophenanthrene-2-aldehydes, amides, and hydrazides are useful as antifertility agents when administered to animals.

CROSS REFERENCE TO RELATED APPLICATION

This application is a divisional of our copending application Ser. No. 709,908, filed Mar. 4, 1968, now matured to Pat. No. 3,565,944.

BACKGROUND OF THE INVENTION

The parent application, Ser. No. 709,908 discloses certain novel di- and polysubstituted derivatives of 2,4'-ethanooctahydrophenanthrene and 2,4'-ethanohexahydrophenanthrene which are useful as postcoital antifertility agents, and claims compounds having the following Formula 1:

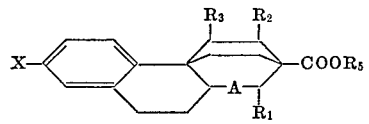

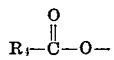
(1)

where A is a single bond or a double bond; each of $R_1$, $R_2$, and $R_3$ independently is hydrogen or a $C_1$–$C_6$ alkyl; X is hydrogen, hydroxyl, or the —OR group, or the $$R_4-\overset{\overset{\text{O}}{\|}}{\text{C}}-\text{O}-$$

group, where R is a $C_1$–$C_4$ alkyl and $R_4$ is hydrogen or a $C_1$–$C_{12}$ alkyl; with the limitation that when X is hydrogen, at least one of $R_1$, $R_2$, and $R_3$ is a $C_1$–$C_6$ alkyl; and $R_5$ is hydrogen, a $C_1$–$C_6$ alkyl, or a nontoxic, pharmaceutically acceptable salt-forming cation.

SUMMARY OF THE INVENTION

Certain other derivatives of 2,4'-ethanooctahydrophenanthrene and 2,4'-ethanohexahydrophenanthrene represented by the following Formula 2, also are effective postcoital antifertility agents:

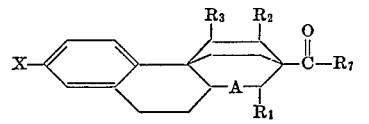

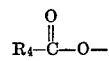
(2)

where A is a single bond or a double bond; each of $R_1$, $R_2$, and $R_3$ independently is hydrogen or a $C_1$–$C_6$ alkyl; X is hydrogen, hydroxyl, the —OR group, or the $$R_4-\overset{\overset{\text{O}}{\|}}{\text{C}}-\text{O}-$$

group, where R is a $C_1$–$C_4$ alkyl and $R_4$ is hydrogen or a $C_1$–$C_{12}$ alkyl; with the proviso that when X is hydrogen, at least one of $R_1$, $R_2$, and $R_3$ is a $C_1$–$C_6$ alkyl; and $R_7$ is hydrogen, the

group, or the

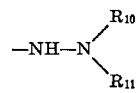

group;

where each of $R_8$, $R_9$, $R_{10}$, $R_{11}$ independently is hydrogen or a $C_1$–$C_3$ alkyl; with the proviso that $R_{10}$ and $R_{11}$, when taken together with the nitrogen to which they are bonded, can form the ring pyrrolidine, piperidine, or morpholine.

DETAILED DESCRIPTION OF THE INVENTION

Preferred compounds of this invention are those in which X is HO—, $CH_3$—O—, $C_2H_5O$—, or $CH_3COO$—; $R_7$ is H and $R_1$, $R_2$ and $R_3$ are hydrogens, or at least one of $R_1$, $R_2$, and $R_3$ is methyl or ethyl. When $R_7$ is the

group, the preferred $R_8$ and $R_9$ are hydrogen atoms. When $R_7$ is the

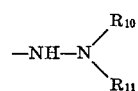

group, the preferred $R_{10}$ and $R_{11}$ are hydrogen atoms.

A convenient starting material for preparing the compounds of this invention is a substituted α-tetralone. The desired α-tetralone is treated with ethyl ethoxymethylenecyanocetate in glyme in the presence of sodium ethoxide under a nitrogen atmosphere. The intermediate thus formed is treated with dilute aqueous hydrochloric acid to give an alpha pyrone such as 8-methoxy-5,6-dihydro-2-oxo-2H-naphtho[1,2-b]pyran-3-carboxylic acid ethyl ester.

The α-pyrone is heated at 150–200° C. with ethylene under pressure (2,000–3,000 atm.) in the presence of a solvent such as benzene or without solvent to give the corresponding 2,3,4,4',9,10-hexahydro-2,4'-ethanophenanthrene-2-carboxylic acid ethyl ester. This ester is then hydrolyzed to give the corresponding 2,3,4,4',9,10-hexahydro-2,4'-ethanophenanthrene-2-carboxylic acid.

In order to prepare the 3,4-alkyl substituted ethanophenanthrene, the above α-pyrone is heated at 150–200° C. with an appropriate monoalkyl or dialkylethylene under pressure (1,000–1,500 atm.) in the presence of a solvent such as benzene or without solvent to give 3,4,9,10-tetrahydro-3,4-dialkylphenanthrene-2-carboxylic acid ethyl ester. This diene is heated at 150–200° C. with ethylene under pressure (2,000–3,000 atm.) to give 2,3,4,4',9,10-hexahydro-3,4-dialkyl-2,4'-ethanophenanthrene-2-carboxylic acid ethyl ester. The order in which the dialkyl substituted ethylene and the ethylene are added to the pyrone can be reversed. When the dialkyl groups of ethylene are not identical or the geometry of the dialkyl substituted ethylene is either cis or trans, the resulting 3,4-dialkyl derivative may consist of several isomers. They can be separated by conventional techniques such as fractional crystallization, distillation or chromatography.

In order to prepare the 2-alkyl substituted derivative, an appropriate 2,3,4,4',9,10-hexahydro-2,4'-ethanophenanthrene-2-carboxylic acid ethyl ester is treated with borane (BH₃) in tetrahydrofuran (THF) or in ethylene glycol dimethyl ether (glyme). The resulting boron derivative is oxidized with chromic acid to give a keto-ester such as 1,2,3,4,4',9,10,10'-octahydro - 2,4' - ethano-1-oxo-phenanthrene-2-carboxylic acid ethyl ester. This keto-ester is contacted with appropriate alkyl Grignard reagent in THF to give the 1-alkyl substituted hydroxy-ester, which on treatment with p-toluenesulfonyl chloride in pyridine gives 2,3,4,4',9,10 - hexahydro-1-alkyl-2,4'-ethanophenanthrene-2-carboxylic acid ethyl ester. The appropriate keto-acid can be employed in this reaction in place of the keto-ester with equally satisfactory results.

When the corresponding 1,2,3,4,4',9,10,10'-octahydro derivatives are desired, 2,3,4,4',9,10 - hexahydro - 2,4'-ethanophenanthrene-2-carboxylic acid ethyl ester can be reduced in the presence of a hydrogenation catalyst such as platinum oxide and a solvent to give corresponding 1,2,3,4,4',9,10,10'-octahydro - 2,4' - ethanophenanthrene-2-carboxylic acid ethyl ester. Solvents which can be used for this reaction include ethanol, ethyl acetate and glacial acetic acid.

A more convenient method of preparing the 1-alkyl-1,2,3,4,4',9,10,10'-octahydro derivative is to treat the above mentioned 1,2,3,4,4',9,10,10'-octahydro-2,4'-ethano-1-oxophenanthrene-2-carboxylic acid ethyl ester with an appropriate alkyl Wittig reagent such as alkylene triphenylphosphine or alkylene phosphonate in THF to give 1,2,3,4,4',9,10,10' - octahydro - 2,4-'-ethano-1-alkylenephenanthrene-2-carboxylic acid ethyl ester. This alkylene derivative is then reduced in the presence of a hydrogenation catalyst in a suitable solvent such as ethanol, ethyl acetate or glacial acetic acid to give corresponding 1,2,3,4,4'-9,10,10' - octahydro-2,4'-ethano-1-alkylphenanthrene-2-carboxylic acid ethyl ester.

The compounds of Formula 2 in which $R_4$ is hydrogen, hereinafter called the aldehydes of this invention, are conveniently prepared in the following manner: the appropriate 1,2,3,4,4',9,10,10'-octahydro- or 2,3,4,4',9,10-hexahydro-2,4'-ethanophenanthrene-2-carboxylic acid is treated with thionyl chloride to give corresponding acyl chloride. The resulting acyl chloride is then reduced with lithium tri-t-butoxy aluminum hydride in THF or diglyme at —70° C. to give the corresponding carboxaldehyde. The 2-carboxylic acid can be made from the corresponding ester by a conventional method such as alkaline hydrolysis followed by acidification.

The compounds of Formula 2 in which $R_7$ is —$NR_8R_9$, hereinafter called the carboxamides of this invention, are prepared by treating the appropriate acyl chloride prepared as above with aqueous solution of the appropriate amine and recovering the precipitated desired carboxamide. Alternatively, the carboxamide of this invention can be made directly from the appropriate carboxylic esters by ammonolysis or aminolysis, according to methods well known in the art.

The compounds of Formula 2 in which $R_7$ is

—NH—$NR_{10}R_{11}$ hereinafter called the carboxylic acid hydrazides of this invention, are conveniently prepared starting with the desired 1,2,3,4,4',9,10,10' - octahydro- or 2,3,4,4',9,10-hexahydro - 2,4' - ethanophenanthrene-2-carboxylic acid lower alkyl ester in a suitable inert solvent such as amyl alcohol. The desired hydrazine is added to this solution and the resulting solution is refluxed for about 72 hours. The mixture is evaporated at reduced pressure and the hydrazide product in the residue is purified using conventional techniques.

Illustrative of the compounds of this invention are the following:

7-methoxy-1,2,3,4,4',9,10,10'-octahydro-2,4'-ethanophenanthrene-2-carboxaldehyde
7-methoxy-2,3,4,4',9,10-hexahydro-2,4'-ethanophenanthrene-2-carboxaldehyde
7-acetoxy-1,2,3,4,4',9,10,10'-octahydro-2,4'-ethanophenanthrene-2-carboxaldehyde
7-acetoxy-2,3,4,4',9,10-hexahydro-2,4-ethanophenanthrene-2-carboxaldehyde
7-methoxy-1-methyl-1,2,3,4,4',9,10,10'-octahydro-2,4'-ethanophenanthrene-2-carboxaldehyde
7-methoxy-1-methyl-2,3,4,4',9,10-hexahydro-2,4'-ethanophenanthrene-2-carboxaldehyde
7-ethoxy-1-ethyl-1,2,3,4,4',9,10,10'-octahydro-2,4'-ethanophenanthrene-2-carboxaldehyde
7-methoxy-3,4-dimethyl-1,2,3,4,4',9,10,10'-octahydro-2,4'-ethanophenanthrene-2-carboxaldehyde
7-methoxy-1-n-propyl-1,2,3,4,4',9,10,10'-octahydro-2,4'-ethanophenanthrene-2-carboxaldehyde
7-acetoxy-1-ethyl-1,2,3,4,4',9,10,10'-octahydro-2,4'-ethanophenanthrene-2-carboxaldehyde
7-methoxy-1,2,3,4,4',9,10,10'-octahydro-2,4'-ethanophenanthrene-2-carboxamide
7-methoxy-2,3,4,4',9,10-hexahydro-2,4'-ethanophenanthrene-2-carboxamide
7-methoxy-1,2,3,4,4',9,10,10'-octahydro-2,4'-ethanophenanthrene-N-methyl-2-carboxamide
7-methoxy-1,2,3,4,4',9,10,10'-octahydro-2,4'-ethanophenanthrene-N,N-dimethyl-2-carboxamide
7-methoxy-1-methyl-1,2,3,4,4',9,10,10'-octahydro-2,4'-ethanophenanthrene-2-carboxamide
7-ethoxy-3,4-dimethyl-1,2,3,4,4',9,10,10'-octahydro-2,4'-ethanophenanthrene-2-carboxamide
7-methoxy-1-ethyl-1,2,3,4,4',9,10,10'-octahydro-2,4'-ethanophenanthrene-2-carboxamide
7-acetoxy-1,2,3,4,4',9,10,10'-octahydro-2,4'-ethanophenanthrene-2-carboxamide
7-ethoxy-1-n-butyl-1,2,3,4,4',9,10,10'-octahydro-2,4'-ethanophenanthrene-2-carboxamide
7-methoxy-4-methyl-1,2,3,4,4',9,10,10'-octahydro-2,4'-ethanophenanthrene-2-carboxamide
7-methoxy-1,2,3,4,4',9,10,10'-octahydro-2,4'-ethanophenanthrene-2-carboxyhydrazide
7-methoxy-2,3,4,4',9,10-hexahydro-2,4'-ethanophenanthrene-2-carboxyhydrazide
7-methoxy-1,2,3,4,4',9,10,10'-octahydro-2,4'-ethanophenanthrene-N'-methyl-2-carboxyhydrazide
7-methoxy-1,2,3,4,4',9,10,10'-octahydro-2,4'-ethanophenanthrene-N',N'-dimethyl-2-carboxyhydrazide
7-ethoxy-1-methyl-1,2,3,4,4',9,10,10'-octahydro-2,4'-ethanophenanthrene-2-carboxyhydrazide
7-methoxy-3,4-dimethyl-1,2,3,4,4',9,10,10'-octahydro-2,4'-ethanophenanthrene-2-carboxyhydrazide
7-methoxy-1-methyl-2,3,4,4',9,10-hexahydro-2,4'-ethanophenanthrene-2-carboxyhydrazide
7-methoxy-1-ethyl-1,2,3,4,4',9,10,10'-octahydro-2,4'-ethanophenanthrene-N'-methyl-2-carboxyhydrazide
7-methoxy-4-methyl-1,2,3,4,4',9,10,10'-octahydro-2,4'-ethanophenanthrene-2-carboxyhydrazide
7-methoxy-3-ethyl-1,2,3,4,4',9,10,10'-octahydro-2,4'-ethanophenanthrene-2-carboxyhydrazide.

As is evident from the foregoing list, many of the compounds of this invention can exist in a number of isomeric forms. It is to be understood that where isomerism is possible, all isomers, both geometric and optical, of a given compound are included within the scope of this invention.

EXAMPLE 1

8-methoxy-5,6-dihydro-2-oxo-2H-naphtho[1,2-b]-pyran-3-carboxylic acid ethyl ester (α-pyrone) 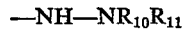

To a mixture of sodium ethoxide prepared from 10.8 parts of sodium hydride and 31 parts of anhydrous ethanol in 300 ml. of anhydrous glyme is added dropwise 67.6 parts of ethyl ethoxymethylenecyanoacetate, followed by 70.4 parts of 6-methoxy-1-tetralone dissolved in glyme. The mixture is stirred at 50° C. for 3 hours and is allowed to cool. It is slowly poured into 500 ml. of 3 N hydrochloric acid. The precipitate is collected by filtration and is suspended on 1 liter of water. The mixture is warmed on steam bath for 3 hours and allowed to cool. The solid product is collected by filtration and washed with water. It is recrystallized from ethanol-water mixture to give pure 8 - methoxy-5,6-dihydro-2-oxo-2H-naphtha[1,2-b]pyran-3-carboxylic acid ethyl ester (α-pyrone); M.P. 141–142.5° C.

Analytical sample was prepared by recrystallizing the pyrone from dimethylformamide-water mixture; M.P. 150.5–152° C.

*Analysis.*—Calc'd for $C_{17}H_{16}O_5$ (percent): C, 67.99; H, 5.37. Found (percent): C, 67.75; H, 5.48.

EXAMPLE 2

The process of Example 1 is repeated but substituting an equivalent amount of 6 - ethoxy - 1 - tetralone for 6-methoxy - 1 - tetralone used in Example 1 to obtain 8-ethoxy - 5,6 - dihydro-2-oxo-2H-naphtho[1,2-b]-pyran-3-carboxylic acid ethyl ester.

EXAMPLE 3

The process of Example 1 is repeated using 6-acetoxy-1-tetralone instead of the 6-methoxy-1-tetralone of Example 1 to produce 8 - hydroxy-5,6-dihydro-2-oxo-2H-naphtho[1,2-b]-pyran-3-carboxylic acid ethyl ester.

The above α-pyrone is dissolved in 300 ml. of acetyl chloride and is heated under reflux for 3 hours. The excess acetyl chloride is removed by evaporation under reduced pressure to give 8-acetoxy-5,6-dihydro-2-oxo-2H-naphtho[1,2-b]-pyran-3-carboxylic acid ethyl ester.

EXAMPLE 4

A solution of 0.2 mole of 8-methoxy-5,6-dihydro-2-oxo-2H-naphtho[1,2-b]-pyran-3-carboxylic acid ethyl ester in 200 ml. of benzene is heated at 200° C. with 3,000 atmospheres of ethylene for 20 hours in a suitable pressure vessel. The mixture is cooled. The benzene is evaporated and the solid residue is isolated. It is recrystallized from 95% ethanol to give pure 7-methoxy-2,3,4,4'-9,10-hexahydro-2,4'-ethanophenanthrene - 2 - carboxylic acid ethyl ester; M.P. 92–92.5° C.

*Analysis.*—Calcd. for $C_{20}H_{24}O_3$ (percent): C, 76.89; H, 7.74. Found (percent): C, 77.17; H, 7.81.

EXAMPLES 5 AND 6

The procedure of Example 4 is repeated substituting an equivalent amount of the listed "α-Pyrone" for the 8-methoxy - 5,6-dihydro-2-oxo-2H-naphtho[1,2-b]-pyran-3-carboxylic acid ethyl ester of Example 4 to obtain the indicated ethanophenanthrene product.

EXAMPLE 7

A solution of 0.2 mole of 5,6 - dihydro - 2 - oxo-2H-naphtho[1,2-b]-pyran-3-carboxylic acid ethyl ester in 200 ml. of benzene is heated at 200° C. with 1,000 atmospheres of 2-cis-butene for 18 hours in a suitable pressure vessel. The mixture is cooled. The benzene is evaporated and the solid residue is isolated. The crude 3,4-cis-dimethyl-3,4,9,10-tetrahydrophenanthrene - 2 - carboxylic acid ethyl ester is redissolved in 200 ml. of benzene and the resulting solution is heated at 200° C. with 3,000 atmospheres of ethylene for 20 hours in a suitable pressure vessel. The mixture is cooled. The benzene is evaporated and the crude product is chromatographed on silicic acid with chloroform as the eluent. Two main fractions are obtained and their i.r. and n.m.r. spectra show them to be exo 3,4 - cis-dimethyl-2,3,4,4',9,10-hexahydro-2,4'-ethanophenanthrene-2-carboxylic acid ethyl ester and endo-3,4-cis-dimethyl - 2,3,4,4',9,10-hexahydro-2,4'-ethanophenanthrene-2-carboxylic acid ethyl ester.

EXAMPLES 8–11

The procedure of Example 7 is repeated substituting an equivalent amount of the indicated "α-Pyrone" for the 5,6-dihydro-2-oxo-2H-naphtho[1,2-b]-pyran-3-carboxylic acid ethyl ester and substituting the indicated 1,2 - dialkyl "Ethylene" for 2-cis-butene of Example 7 to obtain the indicated ethanophenanthrene. The geometrical isomers are separated by means of chromatography on silicic acid, fractional crystallization, or distillation.

| Ex. | α-pyrone | Ethylene | Ethanophenanthrene |
|---|---|---|---|
| 8 | 8-methoxy-5,6-dihydro-2-oxo-2H-naphtho-[1,2-b]pyran-3-carboxylic acid ethyl ester. | 2-cis-butene | 3,4-cis-dimethyl-7-methoxy-2,3,4,4',9,10-hexahydro-2,4'-ethanophenanthrene-2-carboxylic acid ethyl ester. |
| 9 | do | 1-butene | 3-ethyl-7-methoxy-2,3,4,4',9,10-hexahydro-2,4'-ethanophenanthrene-2-carboxylic acid ethyl ester and 4-ethyl-7-methoxy-2,3,4,4',9,10-ethanophenanthrene-2-carboxylic acid ethyl ester. |
| 10 | do | 2-cis-pentane | 3-methyl-4-cis-ethyl-7-methoxy-2,3,4,4',9,10-hexahydro-2,4'-ethanophenanthrene-2-carboxylic acid ethyl ester and 3-ethyl-4-cis methyl-7-methoxy-2,3,4,4',9,10-hexahydro-2,4'-ethanophenanthrene-2-carboxylic acid ethyl ester. |
| 11 | 5,6-dihydro-2-oxo-2H-naphtho[1,2-b]pyran-3-carboxylic acid ethyl ester. | Trans-3-hexene | 3,4-trans-diethyl-2,3,4,4',9,10-hexahydro-2,4'-ethanophenanthrene-2-carboxylic acid ethyl ester. |
| 12 | do | 2-methyl-3-cis-heptene. | 3-iso-propyl-4-cis-n-propyl-2,3,4,4',9,10-hexahydro-2,4'-ethanophenanthrene-2-carboxylic acid ethyl ester and 4-iso-propyl-3-cis-n-propyl-2,3,4,4',9,10-hexahydro-2,4'-ethanophenanthrene-2-carboxylic acid ethyl ester. |

EXAMPLE 13

To a solution of 15.6 parts of 7-methoxy-2,3,4,4',9,10-hexahydro-2,4'-ethanophenanthrene - 2 - carboxylic acid ethyl ester dissolved in 200 ml. of THF is added 55 ml. of 1 M. borane in THF under nitrogen atmosphere over a period of 15 minutes at 25–30°. After two hours, excess borane is destroyed with 15 ml. of water. The chromic acid solution, prepared from 11 parts of sodium dichromate dihydrate and 8.25 ml. of 96% sulfuric acid and diluted with water to 45 ml., is added to the stirred solution over a period of 15 minutes, maintaining the temperature at 25–30°. After stirring at 30–35° for two hours, the mixture is poured into 500 ml. of water. The aqueous mixture is extracted with chloroform. The chloroform extract is dried over anhydrous magnesium sulfate, filtered, and concentrated. The solid residue is recrystallized from ethanol-water mixture to give pure 7-methoxy-1,2,3,4,4',9,10,10'-octahydro - 1 - oxo-2,4'-ethanophenanthrene-2-carboxylic acid ethyl ester.

EXAMPLES 14–18

The procedure of Example 13 is repeated substituting

| Ex. | α.-Pyrone | Ethanophenanthrene |
|---|---|---|
| 5 | 8-ethoxy-5,6-dihydro-2-oxo-2H-naphtho[1,2-b]-pyran-3-carboxylic acid ethyl ester. | 7-ethoxy-2,3,4,4',9,10-hexahydro-2,4'-ethanophenanthrene-2-carboxylic acid ethyl ester. |
| 6 | 8-acetoxy-5,6-dihydro-2-oxo-2H-naphtho[1,2-b]-pyran-3-carboxylic acid ethyl ester. | 7-acetoxy-2,3,4,4',9,10-hexahydro-2,4'-ethanophenanthrene-2-carboxylic acid ethyl ester. | an equivalent amount of the indicated "Hexahydrophenanthrene" for the 7-methoxy-2,3,4,4',9,10-hexahydro-2,4'-ethanophenanthrene-2-carboxylic acid ethyl ester of Example 13 to obtain the indicated octahydro-1-oxo-phenanthrene product.

| Ex. | Hexahydrophenanthrene | Octahydro-1-oxophenanthrene |
|---|---|---|
| 14 | 7-ethoxy-2,3,4,4'-9,10-hexahydro-2,4'-ethanophenanthrene-2-carboxylic acid ethyl ester. | 7-ethoxy-1,2,3,4,4',9,10,10'-octahydro-1-oxo-2,4'-ethanophenanthrene-2-carboxylic acid ethyl ester. |
| 15 | Exo-3,4-cis-dimethyl-2,3,4,4',9,10-hexahydro-2,4'-ethanophenanthrene-2-carboxylic acid ethyl ester. | Exo-3,4-cis-dimethyl-1,2,3,4,4',9,10,10'-octahydro-1-oxo-2,4'-ethanophenanthrene-2-carboxylic acid ethyl ester. |
| 16 | 4-iso-propyl-3-cis-n-propyl-7-acetoxy-2,3,4,4',9,10-hexahydro-2,4'-ethanophenanthrene-2-carboxylic acid ethyl ester. | 4-iso-propyl-3-cis-n-propyl-7-acetoxy-1,2,3,4,4',9,10,10'-octahydro-1-oxo-2,4'-ethanophenanthrene-2-carboxylic acid ethyl ester. |
| 17 | Exo-3-ethyl-7-methoxy-2,3,4,4',9,10-hexahydro-2,4'-ethanophenanthrene-2-carboxylic acid ethyl ester. | Exo-3-ethyl-7-methoxy-1,2,3,4,4',9,10,10'-octahydro-1-oxo-2,4'-ethanophenanthrene-2-carboxylic acid ethyl ester. |
| 18 | Endo-4-methyl-7-methoxy-2,3,4,4',9,10-hexahydro-2,4'-ethanophenanthrene-2-carboxylic acid ethyl ester. | Endo-4-methyl-7-methoxy-1,2,3,4,4',9,10,10'-octahydro-1-oxo-2,4'-ethanophenanthrene-2-carboxylic acid ethyl ester. |

EXAMPLE 19

To a solution of 16.4 parts of 7-methoxy-1,2,3,4,4',9,10,10'-octahydro - 1 - oxo - 2,4' - ethanophenanthrene-2-carboxylic acid ethyl ester dissolved in 100 ml. of THF is added 50 ml. of 1 M. methyl magnesium bromide in ethyl ether under nitrogen atmosphere over a period of 15 minutes, maintaining the temperature at $-10$–$0°$. After stirring at $-10$–$0°$ for 3 hours, the mixture is poured into 300 ml. of saturated aqueous ammonium chloride solution. The upper layer is separated, and the aqueous layer extracted with ethyl ether. The combined organic extracts are dried over anhydrous magnesium sulfate, filtered, and concentrated to give 7-methoxy-1-methyl - 1 - hydroxy - 1,2,3,4,4',9,10,10' - octahydro-2,4'-ethanophenanthrene-2-carboxylic acid ethyl ester.

To a solution of the crude hydroxy-ester dissolved in 100 ml. of pyridine is added portionwise 9.5 parts of p-toluenesulfonyl chloride with stirring, maintaining the temperature at 25–30°. After stirring at 25–30° for one hour, the mixture is poured into 300 ml. of water. The aqueous mixture is extracted with chloroform several times. The combined chloroform extracts are washed with dilute hydrochloric acid, followed by water, dried over anhydrous magnesium sulfate, filtered, and concentrated. The residue is recrystallized from ethanol-water mixture to give pure 7-methoxy-1-methyl-2,3,4,4',9,10-hexahydro - 2,4' - ethanophenanthrene-2-carboxylic acid ethyl ester.

EXAMPLES 20–23

The procedure of Example 19 is repeated substituting an equivalent amount of the indicated "1-Oxophenanthrene" for the 7-methoxy-1,2,3,4,4',9,10,10'-octahydro-1-oxo-2,4'-ethanophenanthrene - 2 - carboxylic acid ethyl ester, and substituting an equivalent amount of the indicated alkyl Grignard reagent for the methylmagnesium bromide of Example 19 to obtain the indicated 1-alkyl-ethanophenanthrene.

EXAMPLE 24

A mixture of 0.2 mole of 7-methoxy-2,3,4,4',9,10-hexahydro-2,4'-ethanophenanthrene-2-carboxylic acid ethyl ester, 200 ml. of ethyl acetate, and 3 parts of 10% palladium on charcoal is hydrogenated at an initial pressure of 50 p.s.i. in a shaker apparatus. When uptake of hydrogen is complete, the catalyst is filtered off, and the filtrate is evaporated at reduced pressure to give 7-methoxy-1,2,3,4,4',9,10,10'-octahydro-2,4'-ethanophenanthrene-2 - carboxylic acid ethyl ester; M.P. 65.5–67.5°.

*Analysis.*—Calcd. for $C_{20}H_{26}O_3$ (percent): C, 76.40; H, 8.34. Found (percent): C, 76.69; H, 8.40.

EXAMPLES 25–31

The procedure of Example 24 is repeated substituting an equivalent amount of the indicated "Hexahydrophenanthrene" for the 7-methoxy-2,3,4,4',9,10-hexahydro-2,4'-ethanophenanthrene-2-carboxylic acid ethyl ester of Example 24 to obtain the listed octahydro derivative. When this procedure results in the formation of geometric isomers, they can be separated by means of chromatography on silicic acid or fractional crystallization.

| Ex. | Hexahydrophenanthrene | Octahydrophenanthrene |
|---|---|---|
| 25 | 7-ethoxy-2,3,4,4',9,10-hexahydro-2,4'-ethanophenanthrene-2-carboxylic acid ethyl ester. | 7-ethoxy-1,2,3,4,4',9,10,10'-octahydro-2,4'-ethanophenanthrene-2-carboxylic acid ethyl ester; M.P. 70–72°. |
| 26 | 7-methoxy-1-methyl-2,3,4,4',9,10-hexahydro-2,4'-ethanophenanthrene-2-carboxylic acid ethyl ester. | 7-methoxy-1-methyl-1,2,3,4,4',9,10,10'-octahydro-2,4'-ethanophenanthrene-2-carboxylic acid ethyl ester. |
| 27 | Exo-3,4-cis-diethyl-1-n-propyl-2,3,4,4',9,10-hexahydro-2,4'-ethanophenanthrene-2-carboxylic acid ethyl ester. | Exo-3,4-cis-diethyl-1-n-propyl-1,2,3,4,4',9,10,10'-octahydro-2,4'-ethanophenanthrene-2-carboxylic acid ethyl ester. |
| 28 | 3-methyl-4-trans-ethyl-7-acetoxy-2,3,4,4',9,10-hexahydro-2,4'-ethanophenanthrene-2-carboxylic acid ethyl ester. | 3-methyl-4-trans-ethyl-7-acetoxy-1,2,3,4,4',9,10,10'-octahydro-2,4'-ethanophenanthrene-2-carboxylic acid ethyl ester. |
| 29 | Exo-3-ethyl-1-methyl-7-methoxy-2,3,4,4',9,10-hexahydro-2,4'-ethanophenanthrene-2-carboxylic acid ethyl ester. | Exo-3-ethyl-1-methyl-7-methoxy-1,2,3,4,4',9,10,10'-octahydro-2,4'-ethanophenanthrene-2-carboxylic acid ethyl ester. |
| 30 | Endo-4-methyl-1-methyl-7-methoxy-2,3,4,4',9,10-hexahydro-2,4'-ethanophenanthrene-2-carboxylic acid ethyl ester. | Endo-4-methyl-1-methyl-7-methoxy-1,2,3,4,4',9,10,10'-octahydro-2,4'-ethanophenanthrene-2-carboxylic acid ethyl ester. |
| 31 | Exo-3-methyl-7-methoxy-2,3,4,4',9,10-hexahydro-2,4'-ethanophenanthrene-2-carboxylic acid ethyl ester. | Exo-3-methyl-7-methoxy-1,2,3,4,4',9,10,10'-octahydro-2,4'-ethanophenanthrene-2-carboxylic acid ethyl ester. |

EXAMPLE 32

Sodium hydride (0.1 mole as a 55% dispersion in mineral oil) is washed with several portions of n-pentane to remove the mineral oil. Dimethyl sulfoxide (50 ml.) is added, and the mixture is heated at 75–80° for 45 minutes, or until the evolution of hydrogen ceases. The resulting solution of methylsulfinyl carbanion is cooled in an ice-water bath, and 0.1 mole of methyltriphenylphosphonium bromide in 100 ml. of warm dimethyl sulfoxide is added. The resulting dark red solution of the ylide is stirred at room temperature for minutes.

To the above red solution is added a solution of 0.11 mole of 7-methoxy-1,2,3,4,4',9,10,10'-octahydro-1-oxo-2,4'-ethanophenanthrene-2-carboxylic acid ethyl ester in 50 ml. of dimethyl sulfoxide, and the reaction mixture is stirred at room temperature for 30 minutes. After cooling in an ice-bath, the mixture is filtered. The filtrate is diluted with 500 ml. of water. The aqueous mixture is extracted

| Ex. | 1-oxophenanthrene | Grignard reagent | 1-alkyl-ethanophenanthrene |
|---|---|---|---|
| 20 | 7-acetoxy-1,2,3,4,4',9,10,10'-octahydro-1-oxo-2,4'-ethanophenanthrene-2-carboxylic acid ethyl ester. | n-Propyl magnesium bromide. | 7-acetoxy-1-n-propyl-2,3,4,4',9,10-hexahydro-2,4'-ethanophenanthrene-2-carboxylic acid ethyl ester. |
| 21 | Exo-3,4-cis-dimethyl-1,2,3,4,4',9,10,10'-octahydro-1-oxo-2,4'-ethanophenanthrene-2-carboxylic acid ethyl ester. | Iso-propyl magnesium bromide. | Exo-3,4-cis-dimethyl-1-iso-propyl-2,3,4,4',9,10-hexahydro-2,4'-ethanophenanthrene-2-carboxylic acid ethyl ester. |
| 22 | Exo-3-ethyl-7-methoxy-1,2,3,4,4',9,10,10'-octahydro-1-oxo-2,4'-ethanophenanthrene-2-carboxylic acid ethyl ester. | Methyl magnesium bromide. | Exo-3-ethyl-1-methyl-7-methoxy-2,3,4,4',9,10-hexahydro-2,4'-ethanophenanthrene-2-carboxylic acid ethyl ester. |
| 23 | Endo-3-methyl-7-methoxy-1,2,3,4,4',9,10,10'-octahydro-1-oxo-2,4'-ethanophenanthrene-2-carboxylic acid ethyl ester. | Methyl magnesium iodide. | Endo-4-methyl-1-methyl-7-methoxy-2,3,4,4',9,10-hexahydro-2,4'-ethanophenanthrene-2-carboxylic acid ethyl ester. | with ethyl ether. The ether solution is dried over anhydrous magnesium sulfate, filtered, and concentrated. The residue is crystallized from 95% ethanol to give 7-methoxy - 1 - methylene - 1,2,3,4,4',9,10,10' - octahydro - 2,4'-ethanophenanthrene-2-carboxylic acid ethyl ester.

A mixture of the above unsaturated ester, 100 ml. of ethyl acetate, and 1.5 parts of 10% palladium on charcoal is hydrogenated at an initial pressure of 50 p.s.i. in a shaker apparatus. When uptake of hydrogen is complete, the catalyst is filtered off, and the filtrate is evaporated at reduced pressure to give 7-methoxy-1-methyl-1,2,3,4,4',9,10,10'-octahydro-2,4' - ethanophenanthrene - 2 - carboxylic acid ethyl ester.

EXAMPLES 33–34

The procedure of Example 32 is repeated substituting an equivalent amount of the indicated "1-oxo-phenanthrene" for the 7-methoxy-1,2,3,4,4',9,10,10'-octahydro-1-oxo-2,4'-ethanophenanthrene-2-carboxylic acid ethyl ester and substituting an equivalent amount of the indicated "Witting reagent" for the methyltriphenylphosphonium bromide of Example 32 to obtain the listed 1-alkyl-octahydro product.

| Ex. | 1-oxo-phenanthrene | Wittig reagent | 1-alkyl-octahydrophenanthrene |
|---|---|---|---|
| 33 | 7-acetoxy-1,2,3,4,4',9,10,10'-octahydro-1-oxo-2,4'-ethanophenanthrene-2-carboxylic acid ethyl ester. | Ethyltriphenylphosphonium bromide. | 7-acetoxy-1-ethyl-1,2,3,4,4',9,10,10'-octahydro-2,4'-ethanophenanthrene-2-carboxylic acid ethyl ester. |
| 34 | Exo-3,4-cis-dimethyl-1,2,3,4,4',9,10,10'-octahydro-1-oxo-2,4'-ethanophenanthrene-2-carboxylic acid ethyl ester. | n-Butyltriphenylphosphonium bromide. | Exo-3,4-cis-dimethyl-1-n-buytl-1,2,3,4,4'-9,10,10'-octahydro-2,4'-ethanophenanthrene-2-carboxylic acid ethyl ester. |

EXAMPLE 35

A mixture of 0.1 mole of 7-acetoxy-2,3,4,4',9,10-hexahydro-2,4'-ethanophenanthrene - 2 - carboxylic acid ethyl ester, 0.11 mole of pyrrolidine, and 300 ml. of benzene is heated under reflux for 3 hours. The mixture is cooled and washed with water, dried over anhydrous magnesium sulfate, filtered, and concentrated at reduced pressure to give 7 - hydroxy-2,3,4,4',9,10-hexahydro-2,4'-ethanophenanthrene-2-carboxylic acid ethyl ester.

Repeating the procedure of Example 35 with an equivalent amount of 7-acetoxy-endo-3,4-cis-diethyl-1,2,3,4,4',9,10,10'-octahydro-2,4'-ethanophenanthrene - 2 - carboxylic acid ethyl ester yields 7-hydroxy-endo-3,4-cis-diethyl-1,2,3,4,4',9,10,10'-octahydro-2,4'-ethanophenanthrene-2 - carboxylic acid ethyl ester.

EXAMPLE 36

A mixture of 1.6 mole of 7-methoxy-2,3,4,4',9,10-hexahydro-2,4'-ethanophenanthrene-2-carboxylic acid ethyl ester, 2.0 mole of powdered sodium hydroxide, and 1000 ml. of diethylene glycol is heated at 160° C. for 2 hours under nitrogen atmosphere. The mixture is cooled and is poured into 4000 ml. of water. The solution is acidified with 400 ml. of 6 N hydrochloric acid. The precipitate is filtered off, is washed with water, and is recrystallized from acetonitrile to give 7-methoxy-2,3,4,4',9,10-hexahydro - 2,4' - ethanophenanthrene-2-carboxylic acid; M.P. 213–216°.

Analysis.—Calcd. for $C_{18}H_{20}O_3$ (percent): C, 76.03; H, 7.09. Found (percent): C, 76.24; H, 7.07.

EXAMPLES 37–45

The procedure of Example 36 is repeated substituting an equivalent amount of the indicated "Ester" for the 7-methoxy - 2,3,4,4',9,10 - hexahydro-2,4'-ethanophenanthrene-2-carboxylic acid ethyl ester of Example 36 to obtain the listed carboxylic acid

| Ex. | Ester | Carboxylic acid |
|---|---|---|
| 37 | 7-methoxy-1,2,3,4,4',9,10,10'-octahydro-2,4'-ethanophenanthrene-2-carboxylic acid ethyl ester. | 7-methoxy-1,2,3,4,4',9,10,10'-octahydro-2,4'-ethanophenanthrene-2-carboxylic acid; M.P. 258–261°. |
| 38 | 7-ethoxy-1,2,3,4,4',9,10,10'-octahydro-2,4'-ethanophenanthrene-2-carboxylic acid ethyl ester. | 7-ethoxy-1,2,3,4,4',9,10,10'-octahydro-2,4'-ethanophenanthrene-2-carboxylic acid. |
| 39 | 7-ethoxy-2,3,4,4',9,10-hexahydro-2,4'-ethanophenanthrene-2-carboxylic acid ethyl ester. | 7-ethoxy-2,3,4,4',9,10-hexahydro-2,4'-ethanophenanthrene-2-carboxylic acid. |
| 40 | 1-methyl-7-methoxy-1,2,3,4,4',9,10,10'-octahydro-2,4'-ethanophenanthrene-2-carboxylic acid ethyl ester. | 1-methyl-7-methoxy-1,2,3,4,4',9,10,10'-octahydro-2,4'-ethanophenanthrene-2-carboxylic acid. |
| 41 | 1-n-propyl-7-ethoxy-2,3,4,4',9,10-octahydro-2,4'-ethanophenanthrene-2-carboxylic acid ethyl ester. | 1-n-propyl-7-ethoxy-2,3,4,4',9,10-octahydro-2,4'-ethanophenanthrene-2-carboxylic acid. |
| 42 | Exo-3,4-cis-diethyl-1,2,3,4,4',9,10,10'-hexahydro-2,4'-ethanophenanthrene-2-carboxylic acid ethyl ester. | Exo-3,4-cis-diethyl-1,2,3,4,4',9,10,10'-hexahydro-2,4'-ethanophenanthrene-2-carboxylic acid. |
| 43 | Endo-3,4-cis-di-iso-propyl-7-methoxy- -methyl-2,3,4,4',9,10-hexahydro-2,4'-ethanophenanthrene-2-carboxylic acid ethyl ester. | Endo-3,4-cis-di-isopropyl-7-methoxy-methyl-2,3,1,4',ℓ,10-hexahydro-2,4'-ethanophenanthrene-2-carboxylic acid. |
| 44 | Endo-3-ethyl-7-methoxy-1,2,3,4 4',9,10,10'-octahydro-2,4'-ethanophenanthrene-2-carboxylic acid ethyl ester. | Endo-3-ethyl-7-methoxy-1,2,3,4,4',9,10,10'-octahydro-2,4'-ethanophenanthrene-2-carboxylic acid. |
| 45 | Endo-4-ethyl-1-methyl-2,3,4,4',9,10-hexahydro-2,4'-ethanophenanthrene-2-carboxylic acid ethyl ester. | Endo-4-ethyl-1-methyl-2,3,4,4',9,10-hexahydro-2,4'-ethanophenanthrene-2-carboxylic acid. |

EXAMPLE 46

A mixture of 0.05 mole of 7-methoxy-2,3,4,4',9,10-hexahydro-2,4'-ethanophenanthrene-2-carboxylic acid and 50 ml. of thionyl chloride is heated under reflux for 30 minutes and cooled. The excess thionyl chloride is removed by concentration at reduced pressure to give 7-methoxy-2,3,4,4',9,10-hexahydro - 2,4' - ethanophenanthrene-2-carboxylic acid chloride.

The above acid chloride is dissolved in 50 ml. of diethylene glycol dimethyl ether (diglyme) and cooled to —70°. To the cooled solution is added 0.05 mole of lithium tri-t-butoxy alminum hydride. The mixture is stirred at —70° for 3 hours and slowly poured into 250 ml. of ice-water. The precipitate is collected by filtration, washed thoroughly with water, and dried to give 7-methoxy-2,3,4,4',9,10 - hexahydro - 2,4'-ethanophenanthrene-2-carboxaldehyde.

EXAMPLES 47–48

The procedure of Example 46 is repeated using indicated starting "Carboxylic acid" to give the indicated "Carboxaldehyde."

| Ex. | Carboxylic acid | Carboxaldehyde |
|---|---|---|
| 47 | 1,2,3,4,4',9,10,10'-octahydro-1-methyl-2,4'-ethanophenanthrene-2-carboxylic acid. | 1,2,3,4,4',9,10,10'-octahydro-1-methyl-2,4'-ethanophenanthrene-2-carboxaldehyde. |
| 48 | 7-acetoxy-1-ethyl-2,3,4,4',9,10-hexahydro-2,4'-ethanophenanthrene-2-carboxylic acid. | 7-acetoxy-1-ethyl-2,3,4,4',9,10-hexahydro-2,4'ethanophenanthrene-2-carboxaldehyde. |

EXAMPLE 49

A solution of 0.1 mole of 7-acetoxy-1-ethyl-2,3,4,4',9,10-octahydro - 2,4' - ethanophenanthrene - 2 - carboxaldehyde and 0.1 mole of potassium carbonate in 100 ml. of 90% ethanol is refluxed for 16 hours. The resulting solution is cooled, poured into ice-water, and acidified with hydrochloric acid. The precipitate is filtered off, is washed with water, and is dried to give 7-hydroxy-1-ethyl-2,3,4,4',9,10 - octahydro - 2,4'-ethanophenanthrene-2-carboxaldehyde.

EXAMPLE 50

A mixture of 0.05 mole of 7-methoxy-2,3,4,4',9,10-hexahydro-2,4'-ethanophenanthrene-2-carboxylic acid and 50 ml. of thionyl chloride is heated under reflux for 30 minutes and cooled. This solution is poured into a cold, stirred, aqueous ammonium hydroxide. The precipitate forms and this precipitate is collected by filtration, washed with water, and dried to give 7-methoxy-2,3,4,4',9,10-hexahydro-2,4'-ethanophenanthrene-2-carboxamide.

EXAMPLES 51–53

The procedure of Example 50 is repeated substituting equivalent amount of the indicated "Acid" for the 7-methoxy - 2,3,4,4',9,10 - hexahydro-2,4'-ethanophenanthrene-2-carboxylic acid and an aqueous solution of the indicated "Amine" for the ammonium hydroxide solution of Example 50 to obtain the indicated product.

EXAMPLE 58

A solution of 0.02 mole of 7-methoxy-1,2,3,4,4',9,10,10'-octahydro-2,4'-ethanophenanthrene-2-carboxylic acid ethyl ester and 0.1 mole of 99% hydrazine in 50 ml. of amyl alcohol is heated under reflux for 3 days. The product is evaporated at reduced pressure to give 7-methoxy-1,2,3,4,4',9,10,10' - octahydro-2,4'-ethanophenanthrene-2-carboxylic acid hydrazide.

EXAMPLE 59

A solution of 0.01 mole of 7-methoxy-1-methyl-2,3,4,4',9,10 - hexahydro-2,4'-ethanophenanthrene-2-carboxylic acid ethyl ester and 0.01 mole of methylhydrazine in 100 ml. of amyl alcohol is heated at 150° C. in an autoclave at autogenous pressure for 16 hours. The mixture is cooled and evaporated to give N'-methyl-7-methoxy-1-methyl - 2,3,4,4',9,10-hexahydro-2,4'-ethanophenanthrene-2-carboxylic acid hydrazide.

When the procedure of Example 59 is repeated, substituting an equivalent amount of 7-hydroxy-2,3,4,4',9,10-hexahydro-2,4'-ethanophenanthrene-2-carboxylic acid ethyl ester and 1,1-di-methylhydrazine for the 7-methoxy-1 - methyl-2,3,4,4',9,10-hexahydro - 2,4' - ethanophenanthrene-2-carboxylic acid ethyl ester and methylhydrazine, respectively, of Example 59, N',N'-dimethyl-7-hydroxy-2,3,4,4',9,10-hexahydro - 2,4' - ethanophenanthrene-2-carboxylic acid hydrazide.

| Ex. | Acid | Amine | Product |
|---|---|---|---|
| 51 | 7-methoxy-1,2,3,4,4',9,10,10'-octahydro-2,4-ethanophenanthrene-2-carboxylic acid. | Methylamine | 7-methoxy-N-methyl-1,2,3,4,4',9,10,10'-octahydro-2,4'-ethanophenanthrene-2-carboxamide. |
| 52 | 7-methoxy-1-n-propyl-2,3,4,4',9,10-hexahydro-2,4'-ethanophenanthrene-2-carboxylic acid. | Diethylamine | N,N-diethyl-7-methoxy-1-n-propyl-2,3,4,4',9,10-hexahydro-2,4'-ethanophenanthrene-2-carboxamide. |
| 53 | Exo-3,4-cis-dimethyl-2,3,4,4',9,10-hexahydro-2,4'-ethanophenanthrene-2-carboxylic acid. | Pyrrolidine | N,N-tetramethylene-exo-3,4-cis-dimethyl-2,3,4,4',9,10-hexahydro-2,4'-ethanophenanthrene-2-carboxamide. |

EXAMPLE 54

A mixture of ten parts of 7-methoxy-2,3,4,4',9,10-hexahydro - 2,2' - ethanophenanthrene-2-carboxylic acid ethyl ester and fifty parts anhydrous ammonia is charged to an autoclave and is heated with shaking at 160° C. for 16 hours at autogenous pressure. The mixture is cooled and excess ammonia is evaporated to give 7-methoxy-2,3,4,4',9,10-hexahydro - 2,4' - ethanophenanthrene-2-carboxamide.

EXAMPLES 55–56

The procedure of Example 54 is repeated, substituting an equivalent amount of the indicated "Ester" and indicated "Amine" respectively for the 7-methoxy-2,3,4,4',9,10-hexahydro - 2,4' - ethanophenanthrene-2-carboxylic acid ethyl ester, and ammonia of Example 54 to obtain the indicated product.

EXAMPLE 60

A mixture of 3.14 parts of N',N'-dimethyl-7-hydroxy-2,3,4,4',9,10-hexahydro - 2,4' - ethanophenanthrene-2-carboxylic acid hydrazide, 54 parts of acetic anhydride, and 4 parts of anhydrous sodium acetate is heated under reflux for one hour. The mixture is allowed to cool and 20 parts of water is added dropwise. The mixture is allowed to stand for 12 hours and is evaporated at reduced pressure. The residue is treated with a mixture of 5% sodium bicarbonate solution and chloroform. The chloroform extract is washed with water, is dried with anhydrous magnesium sulfate, filtered, and concentrated to give N',N'-dimethyl-7-acetoxy - 2,3,4,4',9,10 - hexahydro-2,4'-ethanophenanthrene-2-carboxylic acid hydrazide.

The compounds of Formula 2 can be administered to prevent pregnancy in warm-blooded animals according

| Ex. | Acid | Amine | Product |
|---|---|---|---|
| 55 | 7-hydroxy-1-methyl-2,3,4,4',9,10-hexahydro-2,4'ethanophenanthrene-2-carboxylic acid ethyl ester. | Methylamine | N-methyl-7-hydroxy-1-methyl-2,3,4,4',9,10-hexahydro-2,4'ethanophenanthrene-2-carboxamide. |
| 56 | 7-hydroxy-1,2,3,4,4',9,10,10'-octahydro-2,4'-ethanophenanthrene-2-carboxylic acid methyl ester. | Ammonia | 7-hydroxy-1,2,3,4,4',9,10,10'-octahydro-2,4'-ethanophenanthrene-2-carboxamide. |

EXAMPLE 57

To a solution of 0.01 mole of 7-hydroxy-1,2,3,4,4',9,10,10'-octahydro - 2,4' - ethanophenanthrene-2-carboxamide in 50 ml. of dry pyridine is added 0.01 mole of acetic anhydride. Then, 5 ml. of water is added, and the solution is allowed to stand for 4 hours. The solution is poured into a mixture of 200 parts of ice and 200 ml. of 6 N HCl. When the ice is melted, the precipitate is filtered off, washed thoroughly with water, and dried to give 7 - acetoxy-1,2,3,4,4',9,10,10'-octahydro-2,4'-ethanophenanthrene-2-carboxamide.

to the method of this invention by any suitable means. For example, administration can be parenterally, that is subcutaneously or intramuscularly. Alternatively administration can be by the oral or rectal route. These compounds can be administered in single or divided doses for from 0 to 15 days after coitus.

In general, the dosage for administering the compounds of this invention to warm-blooded animals is in the range of approximately 0.001–50 mg./kg.-day. It is preferred that the compounds of this invention be administered at a dosage of from 0.005–10 mg./kg.-day with a dosage of from 0.01–5 gm./kg.-day being most preferred.

It is also preferred that these compounds be administered in a single oral dose after coitus, but before estimated time of implantation of the fertilized egg in the uterus.

The compounds of this invention are orally effective when administered to warm-blooded animals as is demonstrated by the following test. This test particularly demonstrates that the compounds of this invention demonstrate outstanding inhibition of pregnancy in rats.

EXAMPLE 61

Immature female rats (28 days old) are induced into precocious puberty with a single dose of pregnant mare's serum gonadotrophin and then are mated with normal males. 7 - methoxy-1,2,3,4,4',9,10,10'-octahydro-2,4'-ethanophenanthrene-2-carboxamide suspended in sesame oil is orally administered in graded doses to numerically equal groups of these female rats for six days starting on the day of finding sperm or a vaginal plug. One week after mating, the animals are killed and their uteri are examined for implantation sites. If any are found, the animal is considered pregnant. Control animals have a mean of eight implantation sites. The dose level at which fifty percent of the animals show no evidence of pregnancy, the $ED_{50}$, is between 0.31 and 1.25 mg./kg.-day.

Similar results are obtained when 7-methoxy-1,2,3,4,4',9,10,10' - octahydro-2,4'-ethanophenanthrene-2-carboxaldehyde or 7-methoxy-1,2,3,4,4',9,10,10'-octahydro-2,4'-ethanophenanthrene-2-carboxyhydrazide is substituted in the test of Example 61 for 7-methoxy-1,2,3,4,4',9,10,10'-octahydro-2,4'-ethanophenanthrene-2-carboxamide.

The compounds for the method of this invention can also be employed with equally satisfactory results to prevent pregnancy in other laboratory animals such as mice, guinea pigs, rabbits, monkeys and chimpanzees and are also effective in preventing pregnancy in domestic animals such as swine, cows, sheep and horses. In small animals it is usually convenient to administer the compounds of this invention in the form of a capsule, or incorporated in the feed of the animal. However, when these compounds are administered to large animals, it is often more convenient to administer them parenterally.

The compounds of Formula 2 can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use. In such compositions, the active ingredient will ordinarily always be present in an amount of at least 0.01% by weight based on the total weight of the composition and not more than 90% by weight.

Beside the active ingredient of this invention, the composition will contain a solid or liquid non-toxic pharmaceutical carrier for the active ingredient.

In one embodiment of a pharmaceutical composition of this invention, the solid carrier is a capsule which can be of the ordinary gelatin type. The capsule will contain from about 0.1–75% by weight of a compound of Formula 2 and 99.9–25% of a carrier.

In another embodiment, the active ingredient is tableted with or without adjuvants. In yet another embodiment, the active ingredient is put into powder packets. These capsules, tablets, and powders will generally constitute from about 0.5% to about 95% and preferably from 1% to 50% by weight of active ingredient. These dosage forms preferably contain from about 0.5 to about 250 milligrams of active ingredient, with from about 1 milligram to about 50 milligrams most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 25%, and preferably about 0.1% to 5% by weight of the active ingredient.

As mentioned above, oral administration can be in a suitable suspension, syrup or elixir in which the active ingredient ordinarily will constitute from about 0.01 to 5% and preferably about 0.05 to 1% by weight. The pharmaceutical carrier in such composition can be an aqueous vehicle such as an aromatic water, a syrup or a pharmaceutical mucilage.

Suitable pharmaceutical carriers are described in "Remington's Pharmaceutical Sciences" by E. W. Martin, a well-known reference text in this field.

We claim:
1. A compound of the formula

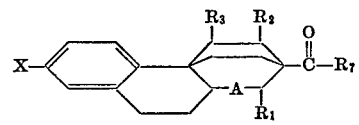

where
A is selected from the group consisting of a single bond and a double bond;
X is selected from the group consisting of hydrogen, hydroxyl, the —OR group, and the

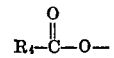

group, wherein
R is a $C_1$–$C_4$ alkyl and $R_4$ is hydrogen or a $C_1$–$C_{12}$ alkyl;
each of $R_1$, $R_2$, and $R_3$ independently is selected from the group consisting of hydrogen and a $C_1$–$C_6$ alkyl; with the proviso that when X is hydrogen, at least one of $R_1$, $R_2$, and $R_3$ is a $C_1$–$C_6$ alkyl; and
$R_7$ is selected from the group consisting of hydrogen, the

group, and the

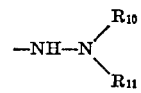

group; where each of $R_8$, $R_9$, $R_{10}$, and $R_{11}$ independently is hydrogen or a $C_1$–$C_3$ alkyl; with the proviso that $R_{10}$ and $R_{11}$, when taken together with the nitrogen to which they are bonded, can form the ring of pyrrolidine, piperidine, or morpholine.

2. A compiund of claim 1 wherein each of $R_1$, $R_2$, and $R_3$ is hydrogen; X is selected from the group consisting of HO—, $CH_3O$—, $C_2H_5O$—, $CH_3$—COO—; and $R_7$ is hydrogen.

3. A compound of claim 1 wherein at least one of $R_1$, $R_2$, and $R_3$ is methyl or ethyl; and X is selected from the group consisting of HO—, $CH_3O$—, and $CH_3COO$—.

4. A compound of claim 1 wherein each of $R_1$, $R_2$, and $R_3$ is hydrogen; X is selected from the group consisting of HO—, $CH_3O$—, $C_2H_5O$—, and $CH_3$—COO—; and $R_7$ is $NH_2$.

5. A compound of claim 1 wherein each of $R_1$, $R_2$, and $R_3$ is hydrogen; X is selected from the group consisting of HO—, $CH_3O$—, and $CH_3OO$—; and $R_7$ is —NH—$NH_2$.

6. A compound of claim 1 wherein at least one of $R_1$, $R_2$, and $R_3$ is methyl or ethyl; X is selected from the group consisting of HO—, $CH_3O$—, and $CH_3COO$—; and $R_7$ is —NH—$NH_2$.

References Cited

UNITED STATES PATENTS

| | | | |
|---|---|---|---|
| 3,446,846 | 5/1969 | Whitney | 260—578 |
| 3,530,165 | 9/1970 | Aldrich et al. | 260—479 |
| 3,564,060 | 2/1971 | Aldrich et al. | 260—613 |

JAMES A. PATTEN, Primary Examiner

U.S. Cl. X.R.

260—247.2 B, 247.5 B, 293.62, 326.85, 326.87, 404, 404.5, 410.5, 600, 558 R, 558 H, 559 R, 559 H, 599